Patented Nov. 21, 1922.

1,436,356

UNITED STATES PATENT OFFICE.

NORMAN N. RANKOW, OF NEW YORK, N. Y.

PAINT.

No Drawing. Application filed February 9, 1921. Serial No. 443,686.

*To all whom it may concern:*

Be it known that I, NORMAN N. RANKOW, a subject of Great Britain, residing at New York, in the county of New York and State of New York, have invented certain new and useful Improvements in Paint, of which the following is a specification.

My said invention relates to a coating composition or paint which will be capable of resisting to an unusual degree the tendency to crack or peel, and also the wearing and disintegrating influences of the elements, whereby it is particularly adapted for use on metal and tarred surfaces as well as on the surface of any material which it is desired to protect and preserve by such a coating. It is particularly applicable to tarred roofing, shealed roofing, and the like and it will be found that after drying the painted material may be bent freely without cracking the paint. When applied on tin plate or corrugated iron a single coat will provide a surface that will not crack under any bending of the metal but will hold until the metal breaks. This quality of resisting cracking under such strain and its durability are peculiar characteristics of this invention. It is also well adapted as a coating for such tarred surfaces as ship bottoms, chimney stacks, standards, and similar structures. For use on a structural iron work, as bridges, elevated railway structures, and the like it will be found exceedingly durable.

In the manufacture of said composition I use the following ingredients or their equivalents in relative proportions substantially as follows:

3 pints of linseed oil.
4 pounds of red lead.
1 quart of turpentine.
⅛ pint of black japan.
⅛ pint of terebene.
2 pounds of Venetian red.

These ingredients are thoroughly mixed and compounded after the manner of mixing and compounding paints generally, or in any approved manner. By the formula above stated the color resulting would be a dark red but, as will be readily understood, by using different appropriate pigments other colors may be obtained as may be desired. Venetian red may be used in smaller quantities and other colors added and the resulting color modified as well understood by paint mixers, and other modifications made without departing from my invention.

In use the paint is applied to the surfaces to be coated therewith by means of a brush or in any other approved manner such as employed in the use of other paints.

Having thus fully described my said invention, what I claim as new and desire to secure by Letters Patent, is:

1. A paint comprising linseed oil, turpentine, terebene, black japan, Venetian red and red lead in the proportions stated, substantially as set forth.

2. A paint comprising linseed oil, turpentine, red lead, terebene, black japan and coloring substance mixed and compounded in substantially the proportions stated.

In witness whereof, I have hereunto set my hand and seal at Washington, District of Columbia, this eighth day of February, A. D. nineteen hundred and twenty-one.

NORMAN N. RANKOW. [L. S.]

Witness:
E. W. BRADFORD.